United States Patent
Chin-Pei et al.

(10) Patent No.: US 7,543,684 B2
(45) Date of Patent: Jun. 9, 2009

(54) OIL-CONDUCTING APPARATUS FOR A LINEAR MOTION SYSTEM

(75) Inventors: Wang Chin-Pei, Taichung (TW); Tsai Chiung-Hui, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 637 days.

(21) Appl. No.: 11/264,844

(22) Filed: Nov. 1, 2005

(65) Prior Publication Data

US 2007/0137931 A1  Jun. 21, 2007

(51) Int. Cl.
*F16N 1/00* (2006.01)
*F16C 17/00* (2006.01)
*F16C 21/00* (2006.01)
*F16C 43/00* (2006.01)

(52) U.S. Cl. .................. 184/5; 384/13; 384/45
(58) Field of Classification Search .......... 184/5; 384/13, 45; 417/559
See application file for complete search history.

(56) References Cited

U.S. PATENT DOCUMENTS

| | | | | |
|---|---|---|---|---|
| 5,117,871 A | * | 6/1992 | Gardner et al. ............ | 137/855 |
| 5,400,871 A | * | 3/1995 | von Sikorski et al. ...... | 184/5 |
| 7,051,762 B2 | * | 5/2006 | Haamer ..................... | 137/855 |
| 2002/0134622 A1 | * | 9/2002 | Michioka et al. ........... | 184/5 |
| 2004/0234176 A1 | * | 11/2004 | Sattler et al. ............... | 384/13 |
| 2006/0163005 A1 | * | 7/2006 | Chuo ........................ | 184/5 |
| 2006/0177163 A1 | * | 8/2006 | Neufang et al. ............ | 384/45 |
| 2007/0071624 A1 | * | 3/2007 | Brewer ..................... | 417/568 |

FOREIGN PATENT DOCUMENTS

EP     0232571 A1 *   8/1987

* cited by examiner

*Primary Examiner*—Jared J Fureman
*Assistant Examiner*—Leslie A Lee
(74) *Attorney, Agent, or Firm*—Charles E. Baxley

(57) ABSTRACT

An oil-conducting apparatus for a linear motion system comprises a first element and a second element, wherein a rolling groove is formed in either lateral surfaces of the second element for reception of a plurality of rolling elements, the oil-conducting apparatus includes an oil tank for storage of lubricant, the oil tank is connected to the guide rolling groove by an oil pipe. At a mid portion of the oil pipe is a compression zone fixed on the first element, the oil pipe is provided with a check valve located at either end of the compression zone, the check valve is to be open toward the oil pipe, the compression zone has a projecting portion that is to be inserted in the rolling groove and pressed by the rolling elements, thus producing pressure in the compression zone and enabling the lubricant to be transported to the rolling passage via the check valve.

9 Claims, 4 Drawing Sheets

OIL-CONDUCTING APPARATUS FOR A LINEAR MOTION SYSTEM

BACKGROUND OF THE INVENTION

1. Field of the Invention

The present invention relates to an oil-conducting apparatus, and more particularly to an oil-conducting apparatus for a linear motion system capable of providing lubricant constantly without requiring any extra power unit.

2. Description of the Prior Art

The current lubricating methods for a linear motion system (including linear guideway and ball screw) generally involve external lubrication and self-lubrication.

The external lubrication means using an external power unit (such as a pump) to transport lubricant to the rolling elements through the oil pipe.

The self-lubrication can be used on a linear guideway for example, it can install a lubricating device on the sliding block, in the lubricating device is received a wool felt containing lubricant, and then the lubricant can be transmitted to the linear guideway because of capillary action. This self-lubrication has been disclosed in U.S. Pat. Nos. 6,401,867, 6,123,457, 6,257,766.

Regarding the external lubrication, it usually sets the pump to run periodically (for example, to run at every 10 seconds), injecting the lubricant into the rolling path. This lubricating method not only requires external power load, but also the lubricant is not injected continuously but periodically, lubricating effect is not good. Furthermore, after a certain time of use, the lubricant may be overly injected, resulting in lubricant leakage and unnecessary waste and contamination.

The self-lubrication doesn't have the aforementioned disadvantages of the external lubrication, however, it also has its shortcomings. As mentioned above, the self-lubrication usually uses a lubricant containing wool felt to supply lubricant by taking advantage of capillary action, one of the resultant shortcomings is that the oil-containing amount and capability of the wool felt is not ideal. Besides, the wool felt is installed in the lubricating device, so that it is difficult to find if the lubricant in the wool felt has been used up, and the rolling elements may not be fully lubricated.

The present invention has arisen to mitigate and/or obviate the afore-described disadvantages.

SUMMARY OF THE INVENTION

The primary objective of the present invention is to provide an oil-conducting apparatus for a linear motion system capable of providing lubricant constantly without requiring any extra power unit.

An oil-conducting apparatus for a linear motion system in accordance with the present invention comprises a first element and a second element, wherein a rolling groove is formed in each of two lateral surfaces of the second element for reception of a plurality of rolling elements, the first element is moveable relative to the second element through rolling action of the rolling elements, the oil-conducting apparatus includes an oil tank for storage of lubricant, the oil tank is connected to the guide rolling groove by at least an oil pipe, at a mid portion of the oil pipe is a hollow compression zone that is to be fixed on the first element, the oil pipe is provided with a check valve at each end of the compression zone, the check valves are to be open toward the oil pipe and extend to an end of the rolling groove, the compression zone has a projecting portion that is to be inserted in the rolling groove and to be pressed by the rolling elements when the rolling elements pass by, thus producing pressure in the compression zone and enabling the lubricant to be transported to the rolling passage via the check valve.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
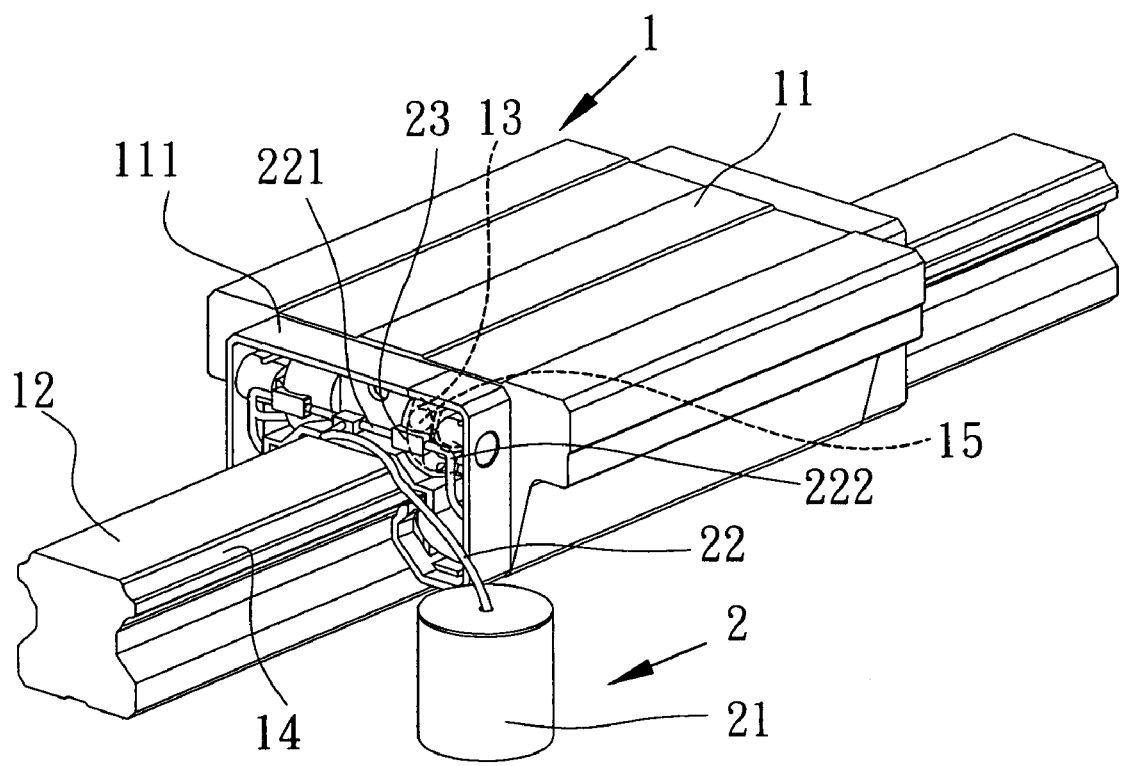
FIG. 1 shows a linear motion system in accordance with a first embodiment of the present invention.
Figure 2:
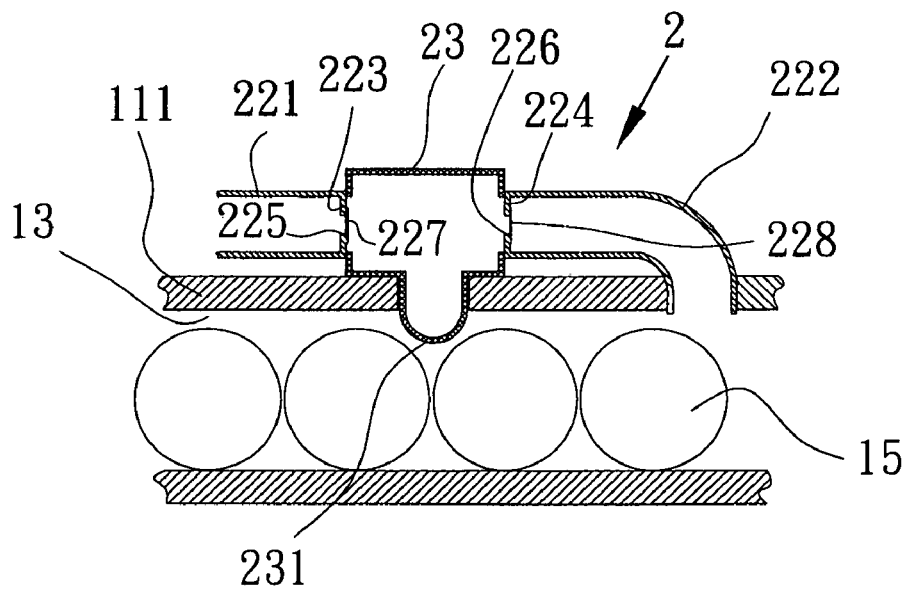
FIG. 2 is a cross sectional view of showing the compression zone of the oil pipe.

Referring to FIGS. 1 and 2, a linear motion system 1 in accordance with a first embodiment of the present invention comprises a first element 11 and a second element 12, in each of both side surfaces of the second element 12 is formed a rolling groove 13, 14 for reception of a plurality of rolling elements 15. The first element 11 is moveable relative to the second element 12 through the rolling action of the rolling elements 15. The first element 11 and the second element 12 in this embodiment are a slide block and a guide rail, and the respective rolling elements 15 are balls.

On the end cap 111 of the slide block 11 is mounted an oil conducting apparatus 2 that includes an oil tank 21 for storage of lubricant. The oil tank 21 is connected to the guide rolling groove 13 by an oil pipe 22, at the mid portion of the oil pipe 22 is a hollow compression zone 23 that is to be fixed on the end cap 111. The oil pipe 22 further includes a connecting portion 221 and an outputting portion 222. The connecting portion 221 is connected to the oil tank 21, the outputting portion 222 is connected to the rolling groove 13, and the connecting portion 221 and the outputting portion 222 are located at either side of the compression zone 23. The connecting portion 221, at its end connected to the compression zone 23 is arranged a spacer 223, and the end of the outputting portion 222 connected to the compression zone 23 is arranged with a spacer 224. The spacer 223 and 224 each is formed with a through hole 225, 226. A valve 227 and 228 is disposed on a side of the spacers 223 and 224 remote from the oil tank 21. The valves 227 and 228 keep pressing against the spacers 223 and 224 in their normal condition, and the size of the valves 227 and 228 are larger than the through holes 225 and 226, and the through holes 225 and 226 are sealed with the valves 227 and 228. The valves 227 and 228 are to be open toward the outputting portion 222 and extend to an end of the rolling groove 13, thus forming a check valve.

The compression zone 23 is made of flexible material and has a projecting portion 231 that is to be inserted in the rolling groove 13 and to be pressed by the rolling elements 15 when the rolling elements 15 pass by, as shown in FIG. 2, thus producing pressure in the compression zone 23 and enabling the lubricant to be transported to the rolling passage 13 via the outputting portion 222.

The compression zone 23, the connecting portion 221 and the outputting portion 222 can be made separately and then are welded together by high frequency welding, or they can be made by plastic ejection molding.

Figure 3:
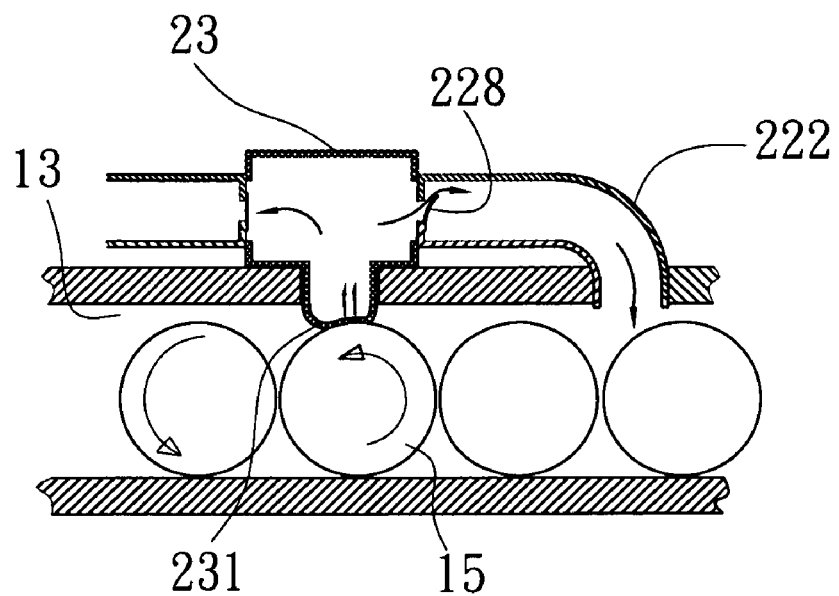
FIG. 3 is an illustrative view of showing that the rolling element is passing the projecting portion of the compression zone.
Figure 4:
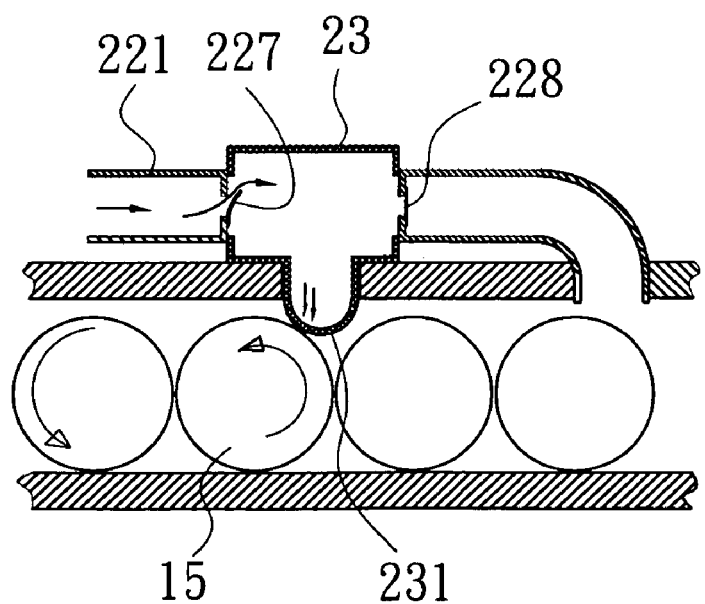
FIG. 4 is another illustrative view of showing that the rolling element is passing the projecting portion of the compression zone.

When the rolling elements 15 move forward along the rolling groove 13, the projecting portion 231 will be pressed by the rolling elements 15, as shown in FIG. 3. The projecting portion 231 will be deformed and produce pressure in the compression zone 23, in this case, the valve 228 will be open, so as to allow the lubricant to flow from the compression zone 23 to the outputting portion 222. Finally the lubricant will flow to the rolling groove 13 to lubricate the rolling elements 15. After the rolling elements 15 move away from the projecting portion 231, as shown in FIG. 4, the previously pressed projection portion 231 will restore to its original shape because its elasticity. At this moment, the valve 228 will be closed, causing a negative pressure in the compression zone 23. Then the valve 227 will be open, so as to suck the lubricant from the connecting portion 221 to the compression zone 23. The valve 227 will be closed again when the pressure of the compression zone 23 is equal to that of the connecting portion 221. In this way, the respective rolling elements 15 will keep pressing the compression zone 23 during rolling action, so that the lubricant will flow from the connecting portion 221 to the compression zone 23 constantly, and finally will flow from the compression zone 23 to the outputting portion 222 and to the rolling groove 13.

For a better understanding of the present invention, its operation and function, the diameter of the rolling element 15 is 4.763 mm for example, the diameter of the rolling groove 13 is 5.0 mm, and the maximum distance from the projecting portion 231 to the inner surface of the rolling groove 13 is 0.5 mm. The amount of the oil that a single rolling element 15 needed is the amount of an oil film fully covering the surface of the rolling element 15. When the thickness of the oil film is 0.001 mm, the amount of the oil that a single rolling element needed is $4/3\pi[(4.763+0.002)^3-(4.763)^3]=0.57$ mm$^3$.

Figure 5:
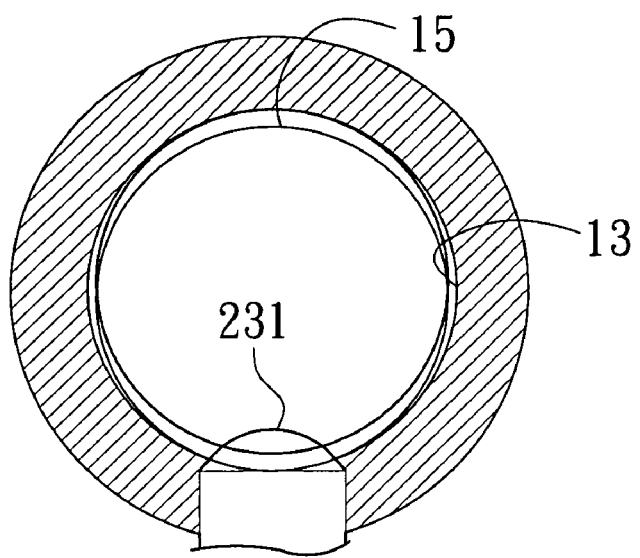
FIG. 5 is a cross sectional view of showing the correlation between the rolling element and the projecting portion of the compression zone.

Since the diameter of the rolling groove 13 is slightly larger than that of the rolling elements 15, the rolling elements 15, during rolling, will shift slightly from their preset positions, as shown in FIG. 5 indicated by the dotted line. The max deformation of the projecting portion 231 in height is approximately 0.3 mm. By using 3 D software (unigraphics), applicant works out the change of the volume of the projecting portion 231 before and after compression ranges from 0.209 mm$^3$-0.716 mm$^3$. In other words, as long as the projecting portion 231 is pressed 1-3 times, it can provide enough lubricant to lubricate a single rolling element 15. Furthermore, the lubricant will not disappear very soon after it is smeared on the surface of the rolling elements or the rolling groove, therefore, after the projecting portion 231 of the compression zone 23 is pressed by the rolling elements 15 respectively, the lubricant constantly injected out of the compression zone 23 will be enough to lubricate the respective rolling elements 15.

In addition, the max deformation of the height of the projecting portion 231 is approximately 0.3 mm, plus the projecting portion 231 is made of flexible material, therefore, the respective rolling elements 15 can pass by successfully without being interfered with by the projecting portion 231.

Thereby, the oil-conducting apparatus in accordance with the present invention can continuously provide lubricant to the rolling groove 13 without any extra power unit.

Figure 6:
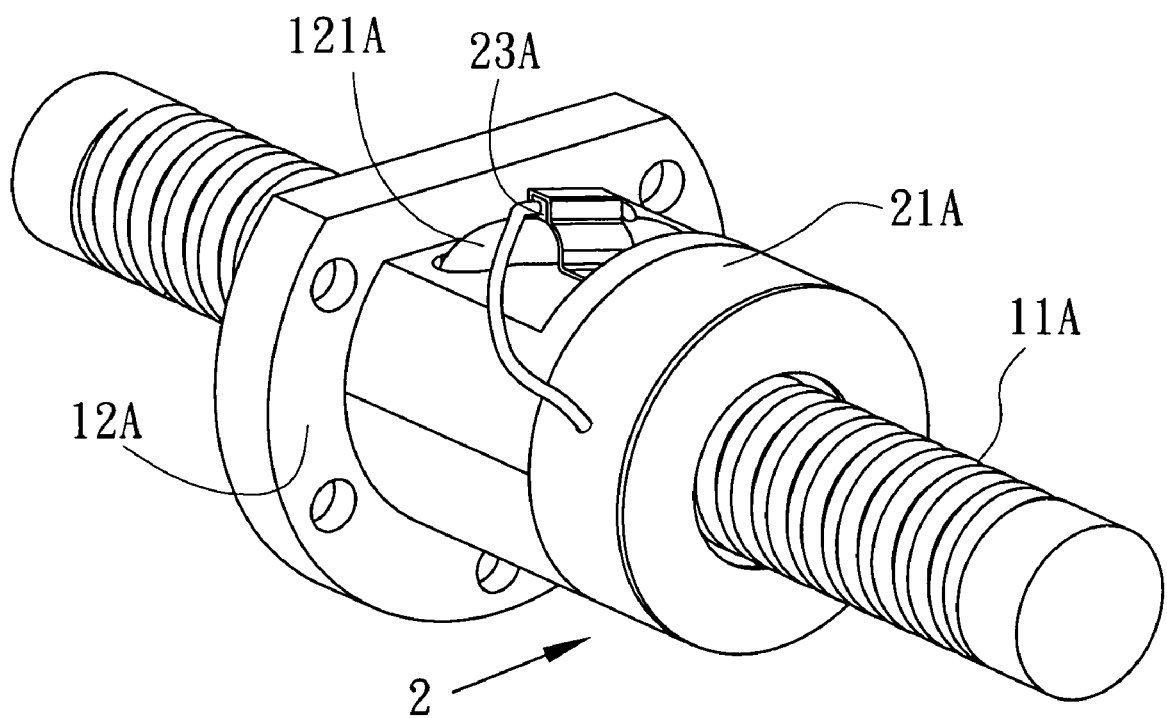
FIG. 6 shows a ball screw in accordance with a second embodiment of the present invention.

Referring to FIG. 6, which shows a second embodiment of the present invention, wherein the first element 11A and the second element 12A are a screw shaft and a screw nut, and the screw shaft and the screw nut form a ball screw. The oil tank 21A of the oil-conducting apparatus 2A is an annular structure installed at an end of the second element 12A. The compression zone 23A is assembled on the return pipe 121A of the second element 12A in such a manner that the projecting portion (not shown) is inserted in the return pipe, and thus the second embodiment can achieve the same function of the first embodiment.

Figure 7:
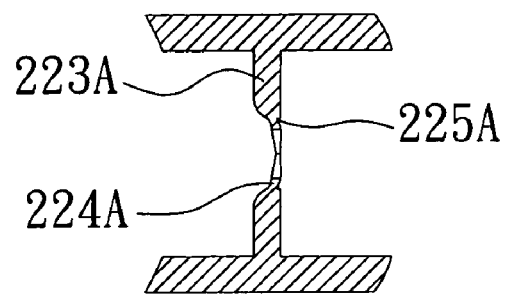
FIG. 7 is a cross sectional view of showing the check valve in accordance with a third embodiment of the present invention.
Figure 8:
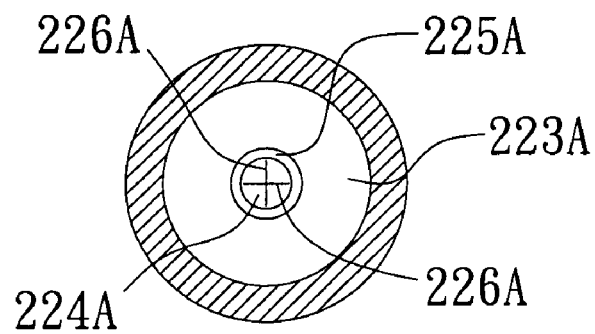
FIG. 8 is another cross sectional view of showing the check valve in accordance with the third embodiment of the present invention.
Figure 9:
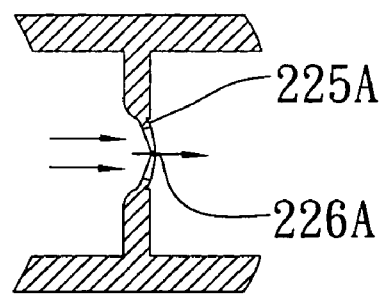
FIG. 9 is an illustrative view in accordance with the third embodiment of showing that the valve is open.

Referring to FIGS. 7 and 8, which show a third embodiment of the present invention, wherein the valve 223A of the connecting portion or the outputting portion of the oil pipe (the valve shown in the drawing is located between the connecting portion and the compression zone of the oil pipe for example), is provided in the center thereof with a film 224A. The film 224A, at its side remote from the oil tank, has an annular concave 225A, and in the annular concave 225A are formed more than one slit 226A. The slits 226A are closed in normal state, when the film 224A is subjected to a force from the left side as shown in FIG. 9, the annular concave 225A of the film 224A will be deformed and the slits 226A will open toward the right side thereof. And after the force disappears, the slits 226A will be closed again. If the film 224A is subjected to a force from the right side, due to there is no concave structure in the left side of the film, the film 224A will not be deformed and the slits 226A will still be closed.

In addition, the rolling elements also can be rollers.

While we have shown and described various embodiments in accordance with the present invention, it should be clear to those skilled in the art that further embodiments may be made without departing from the scope of the present invention.

What is claimed is:

1. An oil-conducting apparatus for a linear motion system comprising a first element and a second element, wherein a rolling groove is formed in each of two lateral surfaces of the second element for reception of a plurality of rolling elements, the first element is moveable relative to the second element through rolling action of the rolling elements, the oil-conducting apparatus includes an oil tank for storage of lubricant, the oil tank is connected to the guide rolling groove by at least an oil pipe, at a mid portion of the oil pipe is a hollow compression zone that is to be fixed on the first element, the oil pipe is provided with a check valve at each end of the compression zone, the check valves are to be open toward the oil pipe and extend to an end of the rolling groove, the compression zone has a projecting portion that is to be inserted in the rolling groove and to be pressed by the rolling elements when the rolling elements pass by, thus producing pressure in the compression zone and enabling the lubricant to be transported to the rolling passage via the check valves.

2. The oil-conducting apparatus for a linear motion system as claimed in claim 1, wherein the compression zone is made of elastic material.

3. The oil-conducting apparatus for a linear motion system as claimed in claim 1, wherein the oil pipe further includes a connecting portion and an outputting portion, the connecting portion is connected to the oil tank, the outputting portion is connected to the rolling groove, and the connecting portion and the outputting portion are located at either ends of the compression zone, the connecting portion and the outputting portion, at each of their ends connected to the compression zone, is arranged a spacer, and the check valves are disposed on the spacers.

4. The oil-conducting apparatus for a linear motion system as claimed in claim 3, wherein the spacers each are formed with a through hole, a valve is disposed on a side of each of the spacers remote from the oil tank so as to form the check valves, and the valves keep pressing against the spacers in normal condition, and the size of each valve is larger than the through hole, and the through hole is sealed with the valves.

5. The oil-conducting apparatus for a linear motion system as claimed in claim 3, wherein each of the spacers is provided in the center thereof with a film, the film, at its side remote from the oil tank, has an annular concave, and in the annular concave are formed at least two slits, the slits are closed in normal state, when the film is subjected to a force, the annular concave of the film will be deformed and the slits will open unidirectionally.

6. The oil-conducting apparatus for a linear motion system as claimed in claim 1, wherein the first element and the second element are a slide block and a guide rail that are assembled together to form a linear guideway, and the compression zone of the oil-conducting apparatus is installed on the slide block.

7. The oil-conducting apparatus for a linear motion system as claimed in claim 1, wherein the first element and the second element are a screw shaft and a screw nut, and the screw shaft and the screw nut are assembled together to form a ball screw, and the compression zone of the oil-conducting apparatus is installed on the screw nut.

8. The oil-conducting apparatus for a linear motion system as claimed in claim 1, wherein the respective rolling elements are balls.

9. The oil-conducting apparatus for a linear motion system as claimed in claim 1, wherein the respective rolling elements are rollers.

* * * * *